May 28, 1963
J. G. HOEGER
3,091,133
INDEXING MECHANISM
Filed Sept. 8, 1960
4 Sheets-Sheet 2
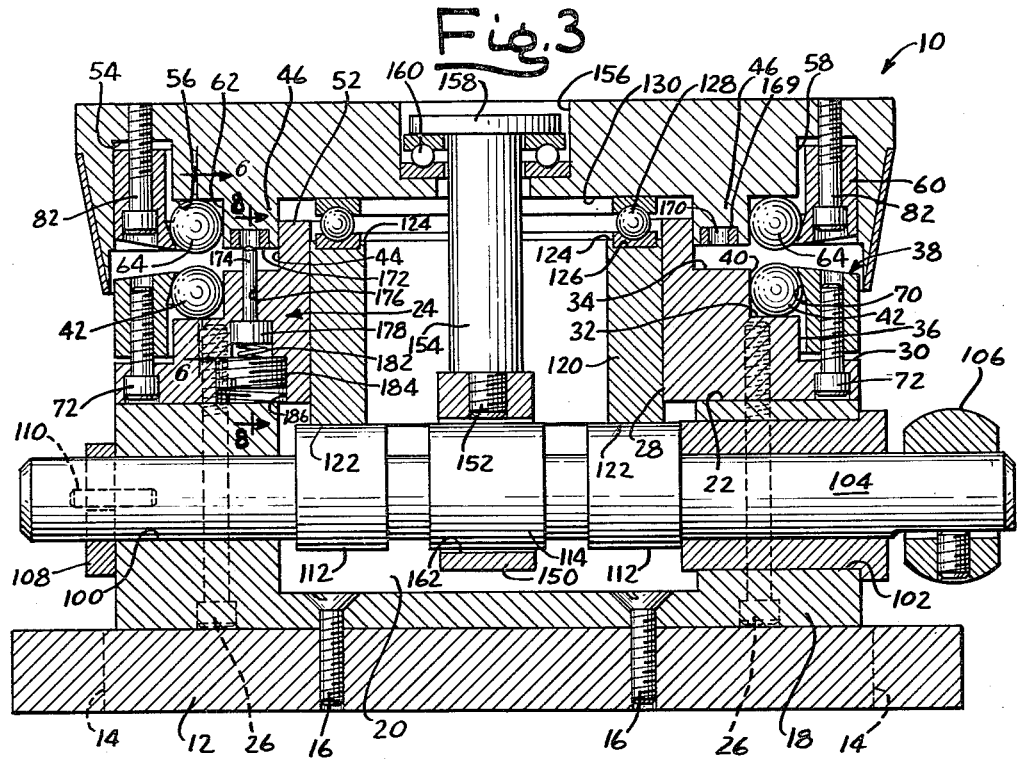
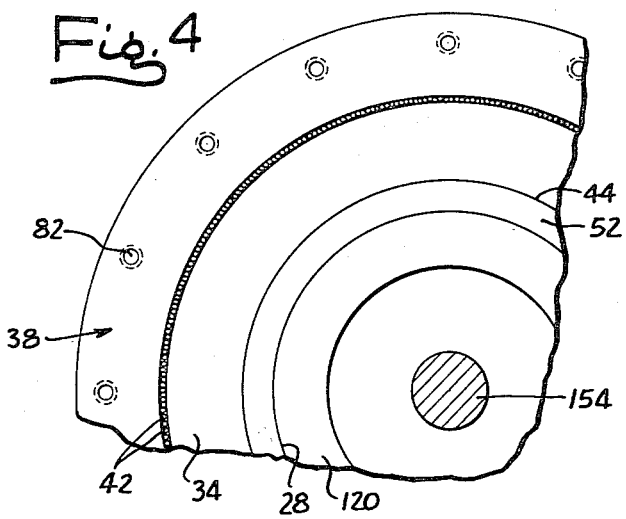
INVENTOR.
JOHN G. HOEGER
BY Norman Gerlach
ATTY.

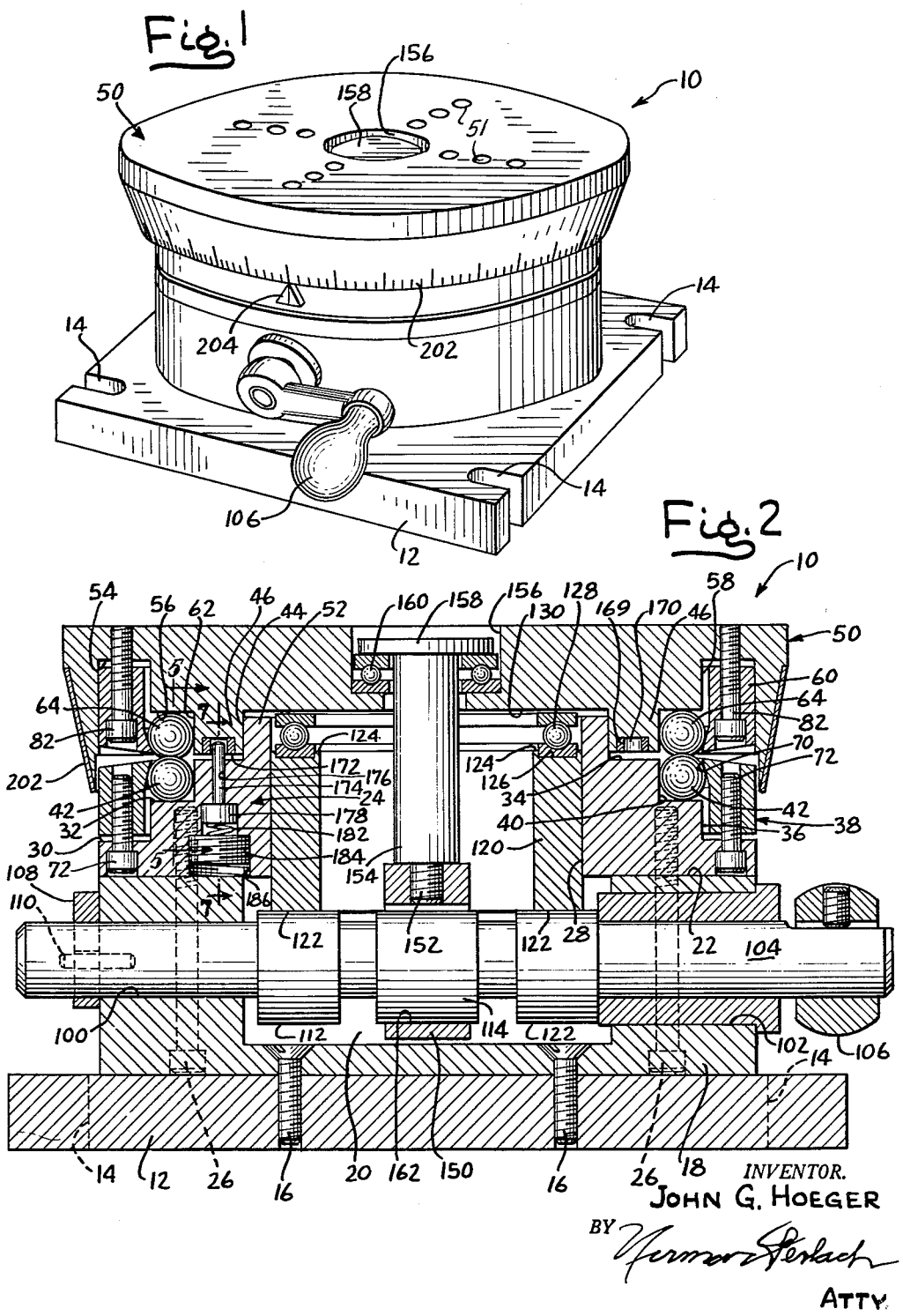

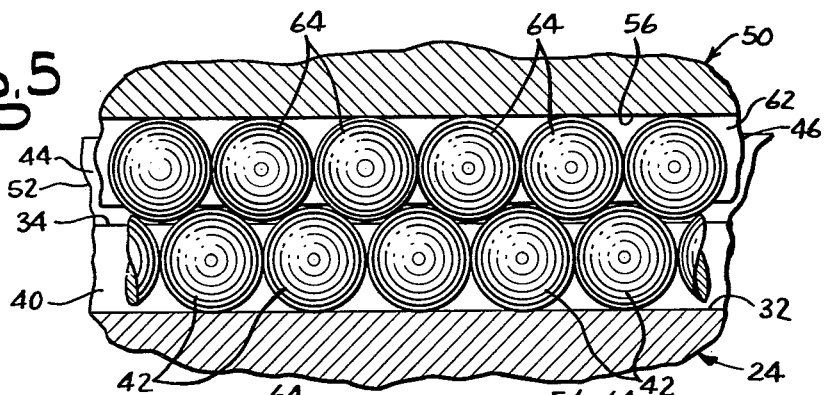
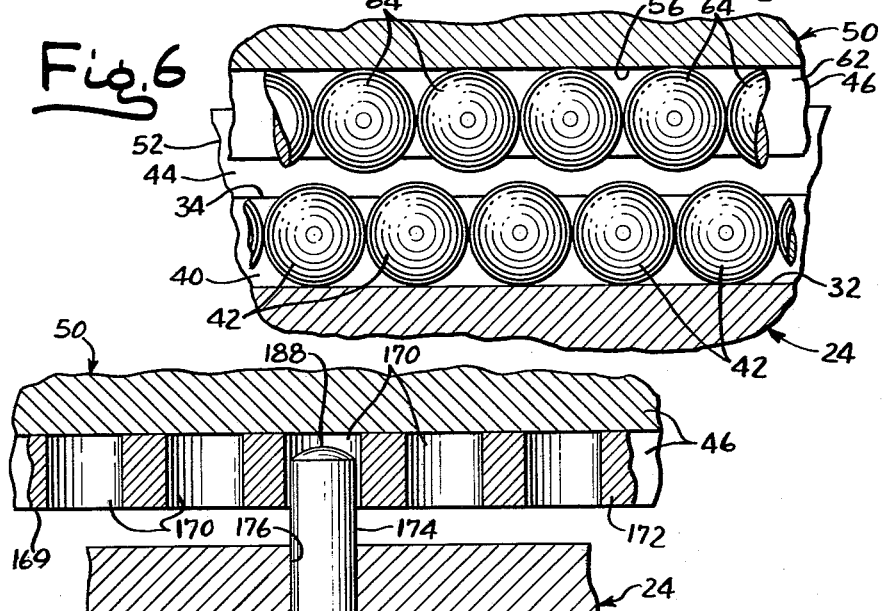
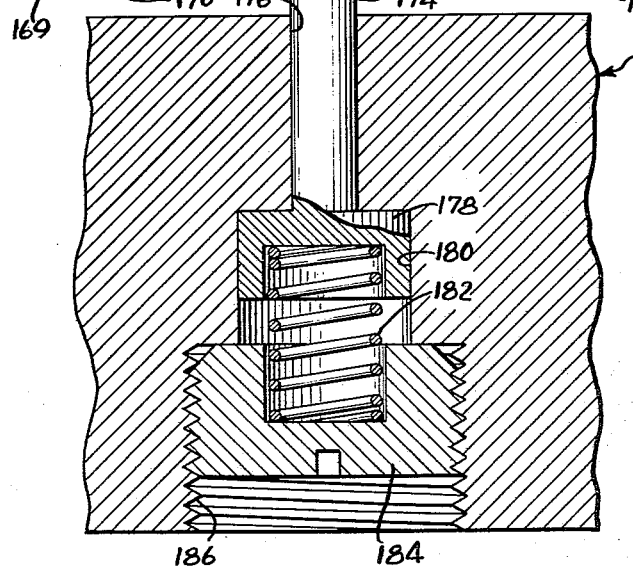

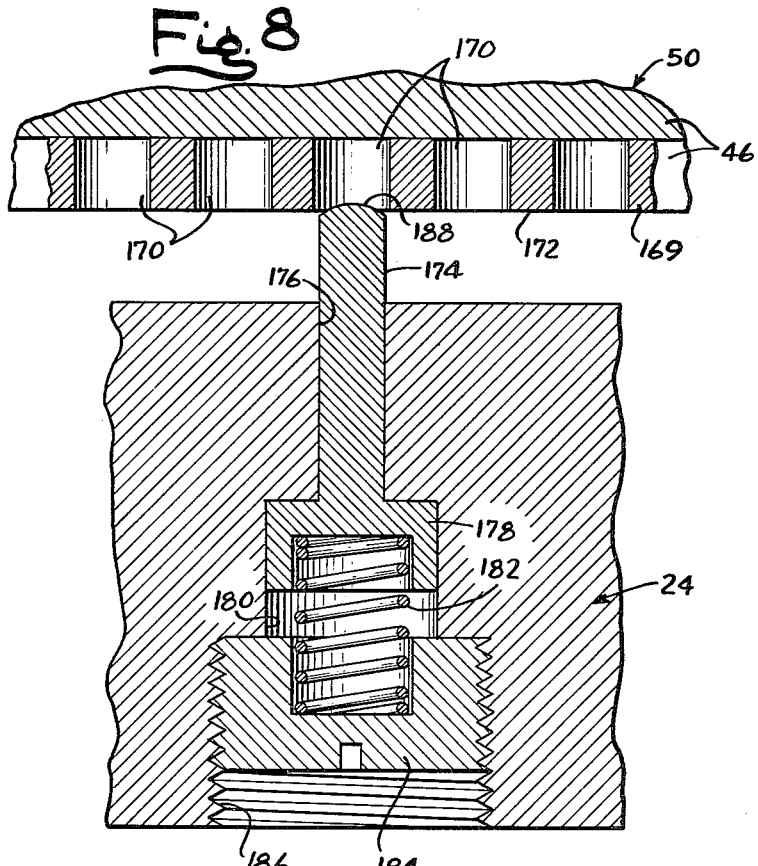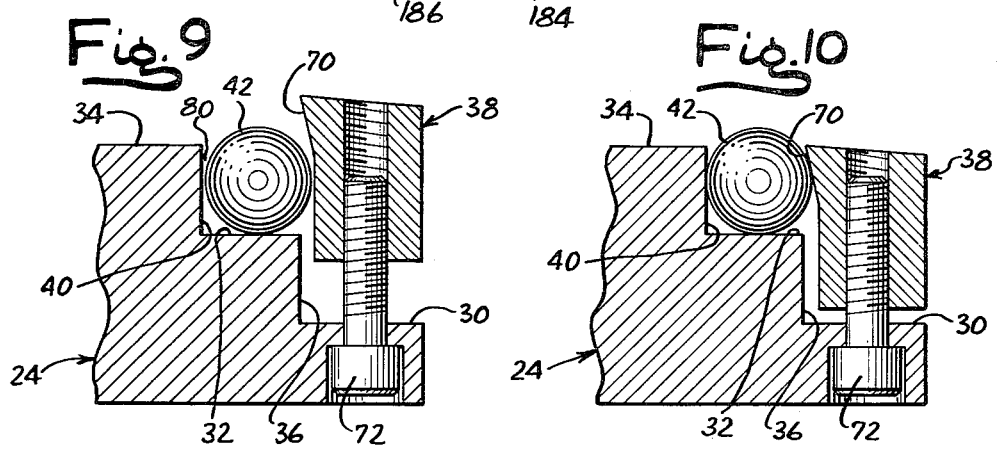

United States Patent Office 3,091,133
Patented May 28, 1963

3,091,133
INDEXING MECHANISM
John G. Hoeger, Skokie, Ill., assignor to Thompson Designs, Inc., Franklin Park, Ill., a corporation of Illinois
Filed Sept. 8, 1960, Ser. No. 54,615
5 Claims. (Cl. 74—826)

The present invention relates to indexing mechanisms and has particular reference to an indexing and dividing fixture which is capable of wide application in industry and also producing uniform circle graduations with a degree of accuracy hitherto unattainable at a cost which is commercially practical.

The invention has been illustrated and described herein in connection with an indexing fixture which is capable of supporting a workpiece and of changing the angular position thereof so that various metal working operations may be performed thereon at angularly spaced regions on the workpiece. Such indexing fixtures are widely used in the metal working field and are known as indexing plates or tables, including as they do, a rotary plate or table mounted in turret fashion on a stationary base. The angular position of the plate may be varied either by the use of a circular scale and pointer device, or by complicated indexing mechanisms whereby the plate or table may be released, rotated on its bearing relatively to the base, and thereafter, locked or secured in the desired angular position. The degree of accuracy afforded by an indexing mechanism or fixture of this type is, generally speaking, commensurate with the cost of the fixture, and, in instances where a high degree of accuracy is required, the complexity of the fixture is such as to make the cost prohibitive.

In connection with indexing fixtures of the type briefly outlined above, efforts have been made to attain better accuracy of indexing and at a lower cost by the use of a stationary base and a rotatable indexing plate having cooperating serrations thereon. The serrations on the plate and base are in the form of annular series of tooth-like projections arranged in circumferential fashion about the peripheries of the two members respectively, the serrations on each member being equal in number to the serrations on the other member and being equally spaced. The various serrations on the two members are designed for selective mating engagement when the two members are brought together. Thus, by separating the two members to such an extent that the serrations thereon clear one another, rotating one member relatively to the other to bring the crest and trough portions of the cooperating series of serrations into vertical register with the two members in approximate positions of orientation, and thereafter, moving the two members axially relatively to each other so as to bring them into mating contact, the plate may be positioned on the base with a reasonably accurate degree of angular orientation.

Indexing fixtures of this specific type are possessed of numerous limitations, both costwise and functionally, it being obvious that the cost of accurate machining of the various serrations will present an economic factor that must be reckoned with. Principal among the limitations that are associated with the use of a fixture of the type under consideration is the fact that the overall efficiency or accuracy of the fixture for any given setting is limited by the misalignment which is imposed by the presence of the least accurately machined serration or tooth. Furthermore, the existence of a single particle of grit or other foreign material between the mating serrated surfaces will exert a misaligning effect on the entire series regardless of the particular adjustment which is sought.

The present invention is designed to overcome the above-noted limitation that is attendant upon the construction and use of conventional indexing fixtures, particularly fixtures which depend for the setting of the indexing plate upon the accuracy of register between mating serrations as set forth above, and, toward this end, it contemplates the provision of a fixture including a stationary base plate and a rotatable indexing plate having cooperating graduated mating surfaces capable of selective register in various angular positions and wherein the cooperating registering surfaces make point contact with each other as distinguished from the area contact which is made between plates having tooth-like serrations, thus minimizing the danger which is attendant upon the presence of foreign particles between the surfaces, as well as effecting an indexing accuracy hitherto unattainable by conventional fixtures of this general type regardless of the care which may be exerted in the machining of parts.

Briefly, in carrying out the present invention, machining of the surfaces which constitute the mating graduations between the indexing plate and the base plate is eliminated altogether and these surfaces are brought into existence by the accurate placement of two series or circular rows of circumferentially arranged steel balls which are accurately spherical and with the balls of each circular row making tangential contact under slight pressure, each with an adjacent ball on each side thereof. The extremely small tolerances which exist in connection with the manufacture of commercial ball bearings and the uniformity of elasticity thereof render such bearing balls entirely satisfactory for use in the present instance and, when so used, the fundamental concept of the invention is based upon the consideration that any irregularities which may exist in the construction of the individual balls, and which to begin with are extremely small due to the fine tolerances associated with ball bearing manufacture, are divided over the entire linear circular extent of the series of balls and are thus reduced practically to nothingness in the overall pattern of mating graduations.

As will become clear presently when the nature of the invention is better understood, the invention further contemplates a method whereby the tangentially disposed balls of each series are brought together in their operative tangential relationship under a sufficient degree of pressure or compression in order fixedly to lock the individual balls in place without destroying their roundness so that each ball in one circular series thereof presents a truly spherical surface designed for tangential mating contact with a similar truly spherical surface on the other series in any of the various positions of relatively angular relationship of which the plates are capable of assuming, i.e., in any given indexed position of the plates, so that the aforementioned points of contact between the mating balls will lie on a common circle concentric with the axis of the two relatively rotatable plates, and, furthermore, will assume precisely equally spaced positions. By such an arrangement, uniform seating of the two plates upon each other in any selected angular relationship and high accuracy of indexing is attained.

The provision of an indexing fixture of the character briefly outlined above being among the principal objects of the invention, it is a further object to provide such a fixture having associated therewith novel means for effecting relative axial movement in opposite directions between the rotatable indexing plate and the fixed base plate with which it cooperates, in order to effect plate separation for release purposes and plate engagement for locking purposes respectively, such means embodying stable support of the indexing plate at all times on opposite sides of the axis of rotation of the plate so that there will be no binding of the parts or tilting of the indexing plate relatively to the base plate.

A still further object of the invention is to provide such an indexing fixture, together with novel locking means whereby the rotatable indexing plate may be positively locked in any selected position of indexing adjustment relatively to the base plate to maintain the two cooperating series of circularly arranged balls in full mating register and under sufficient pressure that no circumferential lost motion between the two plates is possible. By such an arrangement, there will be no axial or angular shifting of the indexing plate under tool pressure when the fixture is in use.

A still further object of the invention, in an indexing fixture of this sort, is to provide a novel form of locating detent means whereby, when the two plates are separated and the indexing plate is thus released for manual turning movements preparatory to bringing the same to an indexed position, the detent means will operate through sensory perceptions, including both sound and the sense of manual feeling, to render an indication of approximate register of the plates in a given relative angular position preparatory to movement of the two plates toward each other for locking purposes. A similar and related object is to provide such a detent means which, in the separated position of the plates, will prevent manual movement of the plates toward each other at the in-between positions of the latter when the same are out of indexing register. By such an arrangement, contact between the balls of one series with the balls of the other series at or near dead-center positions is prevented, thus avoiding possible damage to the same or jamming of the mechanism by means of which the device is operated.

Yet another object of the invention, in an indexing mechanism or fixture of this character, is to provide a novel manipulating means whereby axial movement of the indexing plate away from the base plate for release purposes, and axial movement thereof toward the base plate for locking purposes, may conveniently be effected under the control of a single operating handle and with a minimum of effort on the part of the operator.

As previously stated, the invention has been illustrated and described herein in connection with a workpiece indexing fixture suitable for use as a turret tool post for turret lathes, boring mills, planers and a wide variety of similar machine tools. Such a disclosure is purely exemplary and the invention is capable of many uses other than in connection with machine tools. For example, the invention may, with or without suitable modification, be employed for turntable, turret or platform indexing operations associated with locomotive roundtables, missile-launching platforms, artillery mounts in connection with ordnance and gunnery, both mobile and stationary, astronomical observation platforms, telescope mounts, and a wide variety of other uses too numerous to mention. Whereas in the illustrated embodiment of the invention performance of the actual indexing operation wherein the indexing table or plate is rotated relatively to the base plate is performed by manual means, the invention may be found useful in connection with power-driven turrets and the like. Similarly, whereas manual means are disclosed herein for effecting separation of the indexing and base plates and for effecting the closing of these plates upon each other for locking purposes, automatic or power-driven means may be employed if desired, the invention thus being readily susceptible to automation. Irrespective, however, of the particular use to which the invention may be put, or to the precise form which it may assume, the essential features thereof are at all times preserved.

The provision of an indexing fixture which is relatively simple in its construction and design and which, therefore, may be manufactured at a low cost; one which is possessed of a minimum number of parts, particularly moving parts, and which, therefore, is unlikely to get out of order; one which is rugged and durable and which, therefore, is possessed of a relatively long life; one which requires no intricate machining of parts; one which may be effectively operated by unskilled labor; one which is capable of ease of assembly and disassembly for purposes of inspection of parts, replacement or repair thereof; and one which is attractive in its appearance and pleasing in its design, are further desirable features which have been borne in mind in the production and development of the present invention.

Numerous other objects and advantages of the invention, not at this time enumerated, will become readily apparent as the following description ensues.

In the accompanying four sheets of drawings forming a part of this specification, one illustrative embodiment of the invention has been shown.

In these drawings:

FIG. 1 is a perspective view of an indexing mechanism or fixture embodying the principles of the present invention;

FIG. 2 is a vertical sectional view showing the principal parts of the invention in their engaged position;

FIG. 3 is a sectional view similar to FIG. 2 but showing the parts in their released condition;

FIG. 4 is a fragmentary plan view of a base plate assembly employed in connection with the present invention;

FIG. 5 is an enlarged fragmentary sectional view taken on the line 5—5 of FIG. 2 in a circumferential direction;

FIG. 6 is an enlarged fragmentary sectional view taken on the line 6—6 of FIG. 3 in a circumferential direction;

FIG. 7 is an enlarged sectional view taken on the line 7—7 of FIG. 2;

FIG. 8 is an enlarged sectional view taken on the line 8—8 of FIG. 3;

FIG. 9 is an enlarged fragmentary detail sectional view taken radially through a portion of the indexing fixture during one of the assembly steps associated with the manufacture of the fixture; and FIG. 10 is a sectional view similar to FIG. 8 but showing a succeeding method step.

*General Considerations*

Referring now to the drawings, in detail, and in particular to FIGS. 1 to 3, inclusive, the invention is shown herein for illustrative purposes as being embodied in an indexing mechanism or fixture which has been designated in its entirety at 10. The fixture 10 involves in its general organization a base block 12 of generally rectangular configuration and having marginally disposed notches 14 formed therein and by means of which it may readily be mounted on a worktable or other working surface of a machine tool or the like. Fixedly secured to the upper face of the base block 12 by means of anchoring screws 16 or the like is a base casting 18 which is preferably of cylindrical design and embodies a central circular socket or well 20 in the upper face thereof. The base casting 18 thus provides an upper flat annular face 22.

Secured to the annular upper face of the base casting 18 is a stationary lower supporting member 24 which, for convenience, will hereinafter be referred to as the base plate, suitable anchoring screws 26 being provided for securing the base plate in position on the base casting. The base plate 24 is in the form of an annular ring which has a vertical central cylindrical bore 28 therethrough and is provided with a stepped outer surface configuration (see FIG. 2). The stepped surface configuration of the base plate provides a lower upwardly facing annular land surface 30, an intermediate upwardly facing annular land surface 32, and an upper upwardly facing annular land surface 34. The lower land surface 30 extends outwardly from an adjacent cylindrical wall surface 36, the two surfaces forming between them an annular recess which receives therein the lower regions of a clamping ring 38, the nature and function of which will be made clear presently. The intermediate land surface 32 extends outwardly from an adjacent cylindrical wall surface 40, and these latter two surfaces form therebetween an intermediate annular recess for reception therein of a series of lower locating balls 42, the nature and function of which likewise will be explained subsequently. The upper land surface 34 extends outwardly from an adjacent cylindrical surface 44 and these two last mentioned surfaces provide an annular recess for reception of a circular downwardly projecting boss 46 on the lower face of a generally circular indexing plate 50 which is positioned above the base plate 24, is coaxial therewith, and is mounted for rotation relatively thereto in either direction. Threaded holes 51 may be provided in the upper face of the indexing plate 50 to facilitate clamping of a workpiece to the plate. However, other work clamping means, such as a magnetic chuck device (not shown), may be employed if desired.

As best seen in FIG. 2, the upper indexing plate 50 is maintained in axial alignment with the lower base plate 24 by means of an upwardly projecting piloting rim 52 which extends above the upper land surface 34 and projects into the circular boss 46 with a close frictional fit. The indexing plate 50 is capable of limited vertical axial movement toward and away from the lower base plate 24 for purposes that will become clear presently.

The underneath side of the indexing plate 50 is of stepped configuration in order to provide two downwardly facing land surfaces 54 and 56, respectively. The land surface 54 extends outwardly from an adjacent cylindrical surface 58, the two surfaces together defining an annular recess which receives therein the upper regions of a clamping ring 60 similar to the clamping ring 38. The land surface 56 extends outwardly from an adjacent cylindrical surface 62, the two surfaces 56 and 62 defining an annular recess for reception therein of a series of upper locating balls 64 similar to the series of lower locating balls 42.

*The Locating Balls*

Still referring to FIGS. 1 to 3, inclusive, and additionally, to FIGS. 4 to 6, inclusive, and 10, the disposition of the circumferentially arranged series of balls 42 within the annular recess afforded by the two surfaces 32 and 40 is precisely the same as the disposition of the circumferentially arranged series of balls 64 within the annular recess afforded by the surfaces 56 and 62 and, therefore, a description of the nature of one series of balls will suffice for the other. The number of balls in each series is the same.

It is to be noted from FIGS. 2 and 3 that the two land surfaces 32 and 54 against which the various balls 42 and 64, respectively, are seated, are disposed in vertical opposition to each other so that the two series of balls which are securely held in their respective recesses in the base plate and indexing plate, respectively, are capable of making register and contact with each other when the indexing plate which carries the upper series of balls 64 is moved to the lowered position in which it is illustrated in FIG. 2. When the indexing plate 50 is in the elevated position in which it is shown in FIG. 3, the two series of balls are separated to such an extent that they clear each other and the indexing plate 50 is free to turn in either direction under manual control. Since the number of balls in the upper series is equal to the number of balls in the lower series and since all of the balls are uniform in diameter, as well as being equally spaced from the central vertical axis of the plates 24 and 50, seating of the upper plate assembly upon the lower plate assembly involves a positioning of the balls of the two series in tangential relationship with each individual ball of one series engaging two adjacent balls of the other series as clearly shown in FIG. 5. The two plates 18 and 50 may thus be brought into just as many positions with reference to each other as there are balls in each series.

The number of balls in each series of balls may vary widely from a lower limit of three balls to an upper limit which is determined only by the effective diameter of the plates 24 and 50 and the use of balls sufficiently large that the graduations which they create between them are at least perceptible and effective for seating purposes. In FIG. 4, the illustration is intended, for exemplary purposes, to disclose a plate which carries a circular series of 360 balls, in which case it is obvious that the upper indexing plate will be capable of being selectively indexed into 360 different angular positions disposed one degree apart. However, it is within the scope of the invention to employ a greater or lesser number of balls in each series as may be dictated according to engineering experiences to attain the desired increments of indexing movement. Irrespective, however, of the particular number of balls employed in each series, the essential features of the invention remain substantially the same.

Referring now to FIGS. 3 and 10, the various balls 42, which may be 360 in number, as previously described, are disposed within the annular recess afforded by the surfaces 32 and 40 and they are arranged in a circular row with adjacent balls being in tangential contact (see also FIG. 5). The balls make substantial point contact with the flat annular surface 32 of the base plate 18 and they are compressed inwardly against the cylindrical surface 40 by means of the clamping ring 38 which surrounds the balls and is formed with a generally frusto-conical clamping surface 70 on its inside face. The clamping ring 38 is adapted to be drawn downwardly toward the land surface 30 by means of a series of circumferentially spaced clamping screws 72 which project upwardly through the peripheral regions of the base plate 24 and extend into, and are received in, threaded bores 74 in the clamping ring 38. The surfaces 30 and 42, in combination with the frusto-conical clamping surface 70, thus define, in effect, an annular channel or trough within which the various balls 42 are effectively wedged in fixed relationship with respect to one another and in fixed relationship with respect to the base plate 24.

The balls 42 are preferably in the form of commercially available steel bearing balls such as are commonly used in connection with anti-friction bearings. Such balls are possessed of an extremely high degree of accuracy as regards their spherical contour and, in the manufacture thereof, permissible tolerances are on the order of 0.000001 inch as regards their diameter in any direction. A steel bearing ball, regardless of the hardness thereof, is possessed of a very small degree of elasticity. A solid spherical body having any degree of elasticity whatsoever, even to the extreme degree possessed by a body of elastomeric material such as rubber, is not appreciably misshapen by the application of a moderate degree of compressional force thereto at diametrically opposed regions. If the compressing media presents planar contact faces, as, for example, the inside clamping surfaces of a vise, initial application of compressional forces to the spherical body from opposite sides thereof will merely create oppositely disposed small area flats on the surface of the sphere. The infinitesimal amount of displaced metal will scarcely disturb the molecular disposition of the remainder of the sphere and, except for the minute flats mentioned above, the outer surface of the sphere will remain truly spherical. Where tangentially arranged balls under compression are concerned, the flats existing between balls at the regions of tangency are even smaller than they are in the case of planar pressure surfaces.

*The method of ball installation*

In applying the balls 42 to the base plate 24, the requisite number of balls are loosely positioned on the land surface 32 in their approximate positions of tangency and they are confined on the surface 32 by means of the clamping ring 38 which loosely surrounds them as indicated in FIG. 9. Assuming for purposes of discussion that the balls are caused to align themselves on the annular surface 32 so as to form a precise circular row of tangentially arranged balls, the selected number of balls and the selected diameter of the individual balls is such that there will be a slight clearance between each ball and the adjacent cylindrical surface 40, such a clearance being indicated in FIG. 9 at 80. This clearance will be extremely small and may be measured in millionths of an inch. With the balls thus loosely positioned on the surface 32, the various clamping screws 72 are tightened so as to draw the frusto-conical clamping surface 70 against the balls to force the same radially inwards against the cylindrical surface 40 and close the gap 80 so that all of the balls in the circular row of balls make tangential as well as point contact with this surface.

It is to be noted that such inward pressure as is applied to the balls 42 by the frusto-conical clamping surface 70, causes the various tangentially disposed balls to exert pressure upon one another in a circumferential direction, thus establishing the relatively small microscopic flats on the various balls at the regions of tangency. The amount of tightening required of the various clamping screws 72 may be ascertained by the operator who will adjust his torque wrench to a pressure slightly in excess of that required to establish five points of tangency on each ball, one for each surface 32, 40 and 70, and two for the tangential contact which each ball makes with the adjacent balls on opposite sides thereof.

The procedure involved in assembling the various balls 42 on the lower base plate 24 may be followed for assembly of the balls 64 on the upper indexing plate 50, utilizing the clamping ring 60 and clamping screws 82 associated therewith for ball-clamping purposes and thus a detailed description of this procedure need not be repeated herein. It will be understood that the assembly may be accomplished on a work bench with the ball seating land surface 56 facing upwardly. It is to be noted, however, that the clamping screws 82 extend through the clamping ring 60 from the underneath side thereof as viewed in FIG. 2 so that they are not readily accessible in the assembled fixture, this expedient being resorted to in order to discourage unauthorized tampering with the adjustment by an operator.

*The Indexing Plate Raising and Lowering Mechanism*

Referring now to FIG. 2, manual means are provided for shifting the indexing plate 50 vertically in opposite directions between a raised position wherein the upper series of balls 64 clear the lower series of balls 42 to permit manual turning of the indexing plate in either direction of rotation for indexing purposes, and a lowered position wherein the upper series of balls seat tangentially on the lower series of balls with the plate being effectively locked in such lowered position.

Accordingly, the lower region of the base casting 18 is formed with a radially extending bore 100 on one side thereof and this bore communicates with the central socket 20. A similar radially extending bore 102 is provided on the other side of the socket in diametric alignment with the bore 100. Rotatably journalled in, and projecting completely through, the two aligned bores 100 and 102 is an operating shaft 104 having a manipulating handle 106 on one projecting end thereof and a limit collar 108 on the other projecting end thereof. The limit collar 108 is designed for cooperation with a stop pin 110 in restricting rotational movements of the shaft 104 to approximately 180° in either direction under the control of the handle 106.

The shaft 104 extends across the circular socket 20 and it is provided with a pair of spaced apart eccentric cam lobes 112 and a medial eccentric cam lobe 114. The three lobes are eccentric in the same direction. The two lobes 112 function as plate-lifting lobes for raising the indexing plate 50 to its raised position, while the lobe 114 functions as a plate-locking lobe for securing the indexing plate in its lowered position in any selected position of indexing adjustment.

Slidably disposed within the central bore 28 of the base plate 24 is a cylindrical thrust ring 120. The upper circular rim 124 of the thrust ring 120 is formed with an annular groove 126 therein within which there is disposed an anti-friction bearing assembly 128. The bearing assembly 128 is interposed between the upper rim 124 of the ring 120 and the underneath face 130 of the indexing plate 50. When the manipulating handle 106 is turned so that the cam lobes 112 are in their uppermost position as shown in FIG. 3, the indexing plate 50 will assume its elevated position wherein the balls 64 clear the balls 42 and, except for the provision of certain detent means subsequently to be described, the indexing plate is free to be rotated manually in either direction. When the manipulating handle 106 is turned so that the cam lobes 112 are in their lowermost position as shown in FIG. 2, the indexing plate will assume its lowered position with the balls 64 resting tangentially upon the balls 42 in a selected position of indexing adjustment.

*The Indexing Plate Locking Mechanism*

When the indexing plate 50 is in its lowered position as described above, means are provided for securely locking the plate in such position. Accordingly, the cam lobe 114 is surrounded by a cage-like structure 150 which is of rectangular design and is secured on a threaded stud 152 to the lower end of a vertical pull rod 154. The upper end of the pull rod 154 projects through the indexing plate 50 and terminates within a circular centrally disposed socket 156 in the upper side of the plate. The upper end of the pull rod 154 is provided with a head or lateral flange 158 which overlies an anti-friction bearing 160 on the bottom wall of the socket 156. As shown in FIG. 3, when the manipulating handle 106 is so disposed that the cam lobe 114 is in its lowermost position, the same will make camming engagement with the upwardly facing inside surface 162 of the cage-like structure 150 and cause a downward thrust to be applied to the bearing 160, and consequently, to the indexing plate 50, as a whole, so that the bearing will be under compression while the pull rod will be under tension. The net result of such tensional and compressional forces is to apply a slight compression to the balls 64 and 42, thus locking the indexing plate against turning movement relative to the base plate 24.

*The Detent Structure*

Referring now to FIGS. 2, 3, 6, 7 and 8, the downwardly projecting boss 46 is provided with an annular ring-like insert 169 having a series of equally and circumferentially spaced annular holes 170 in the underneath face 172 thereof, these holes being equal in number to the number of balls in each series of balls. The various holes 170 are designed for cooperation with one or more detent pins 174, two such pins being employed herein at diametrically spaced regions on the base plate 24. The pins 174 project upwardly through bores 176 in the base plate and are formed with enlarged heads 178 which are disposed in sockets 180 formed in the underneath side of the base plate. The detent pins 174 are normally and yieldingly urged upwardly by means of spiral compression springs 182 which are interposed between the pin heads 178 and tension-adjusting screws 184, which are threadedly received in socket enlargements 186. The extreme upper ends of the detent pins 174 are rounded as at 188 for sliding engagement with the underneath annular face of the insert 169 provided in the boss 46 when the pins are not in register with the holes 170. The diameter of the holes 170 is somewhat greater than the diameter of the pins 174 so that slight freedom of rotational movement of the indexing plate 50 relatively to the base plate 24 is possible when the detent pins project into the selected holes 170.

For the above description, it will be seen that the rounded ends 188 of the detent pins 174 will normally ride upon the underneath face of the insert 169 and that they are capable of snapping, so to speak, into the successive holes 170 as the upper indexing plate 50 is rotated relatively to the fixed base plate 24. The audible clicks which take place as the detent pins 176 thus encounter the various holes 170 successively are useful to the operator in ascertaining the degree of angular turning movement involved while manipulating the indexing plate. In the event that the operator attempts to lower the indexing plate 50 while the detents are out of register with any of the holes 170, the heads 178 of the detents will become bottomed against the tension-adjusting screws 184 and thus prevent lowering of the plate 50.

*The Indexing Scale*

As best shown in FIGS. 1, 2 and 3, a combined dust guard apron and scale ring 200 surrounds and is suitably secured to the peripheral region of the indexing plate 50. The apron depends below the level of the clamping ring 60 and partially overhangs the clamping ring 38. The lower edge of the apron is in close proximity to the outer cylindrical surface of the latter ring 38 and serves to exclude the entrance of dust, dirt and other foreign material to the interior of the fixture 10 where the operative working parts of the same are disposed. A suitable scale 202 which may be graduated in angular degrees or fractions thereof may be inscribed on the lower region of the apron 200 for cooperation with a suitable pointer 204 which may be inscribed on the clamping ring 38.

*Operation of the Device*

In the operation of the herein described indexing fixture 10, assuming the parts to be in the locked position in which they are illustrated in FIG. 2, when it is desired to alter the setting of the indexing plate 50 relatively to the base plate 24, it is merely necessary for the operator to engage the manipulating handle 106 and turn the same in a direction to move the two cam lobes 112 to the uppermost position in which they are illustrated in FIG. 3. This movement of the cam lobes exerts a camming action on the underneath annular face 122 of the thrust ring 120 and causes the thrust ring to be elevated. Elevation of the thrust ring 120 exerts an upward thrust on the upper indexing plate 50 through the medium of the anti-friction bearing assembly 160 so that the plate is elevated to the position wherein it is shown in FIG. 3. In this elevated position of the indexing plate 50, the two series of balls 42 and 64 clear each other so that it is possible manually to turn the indexing plate into any desired angular position.

As previously explained, during such manual turning of the indexing plate 50 in one direction or the other, the upper rounded ends 188 of the detent pins 174 will slide frictionally on the underneath annular surface 172 of the boss 46 and move into and out of the various holes 170 in succession in passing. The audible click which accompanies such rotational movement of the indexing plate 50 may assist the operator in ascertaining the extent to which the plate has been turned in the performance of the indexing operation. During the time that the upper ends of the detent pins 174 are in frictional sliding engagement with the surface 172, the enlarged heads 178 of the detent, will, by bottoming on the upper faces of the adjusting screws 184, prevent premature manipulation of the handle 106 for the purpose of causing lowering of the indexing plate. Only at such time as the detent pins 174 are in vertical register with respective holes 170 will such lowering of the indexing plate 50 to its locked position be possible.

At such time as the indexing plate 50 has been turned to the desired position of angular relationship relatively to the base plate 24, the handle 106 may be manipulated to cause the cam lobes 112 to move downwardly and release the upper indexing plate which follows the movement of the cam lobes and descends upon the base plate 24. At such time as the two sets of balls 42 and 64 move into operative contact for accurate angular locating purposes, the medial cam lobe 114 exerts downward pressure on the surface 162 of the cage-like structure 150 and thus applies tension to the pull rod 154 to lock the plates 24 and 50 in place.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In an indexing mechanism of the character described, a fixed base plate, a movable indexing plate mounted on and overlying said base plate and rotatable thereon about a vertical axis, said indexing plate being movable vertically toward and away from said base plate in an axial direction between a lowered proximate position and a raised remote position, a circular row of spherical hardened steel balls of the precision ball bearing variety fixedly secured to the juxtapositioned face of each plate, all of said balls being of equal diameter, the balls of each row being equal in number, the adjacent balls of each row being in mutual tangential contact so that all of the balls in the row present a circular solid steel column encircling said vertical axis, the mean diameter of each row of balls being equal, the row of balls associated with the indexing plate being adapted to seat upon the row of balls associated with the base plate when the indexing plate is in its proximate position with each ball in a row tangentially contacting two adjacent balls in the other row, an actuating shaft for said indexing plate rotatably disposed on said base plate, a lifting cam on said shaft and effectively engageable with said indexing plate for raising and lowering the same, a locking cam on said shaft and effectively engageable with said indexing plate for drawing said plate downwardly to place the two rows of balls under compression when said indexing plate is in its proximate position, and a spring-pressed detent carried by one of said plates and engageable with the other plate, said detent being in the form of a pin having a rounded end, said other plate being formed with a circular row of detent holes, one for each ball in a row, said holes being positioned for selective register with said detent pin when said indexing and base plates are in corresponding positions of indexing, the rounded end of said detent pin being positioned for camming engagement with the edges of said detent holes during rotation of the indexing plate when the latter is in its remote position to the end that audible clicks may be emitted during such rotation, said detent pin being telescopically receivable in said detent holes when the indexing plate is in its proximate position.

2. An indexing mechanism comprising a base plate, an indexing plate positioned in opposed relation with the base plate and rotatable relatively to the latter about a central axis at right angles to the two plates, said base and indexing plates presenting opposed planar parallel inside faces and being movable toward and away from each other between proximate and remote positions, means on each of the opposed faces of the plates defining a circular channel in concentric relation with said axis, the radii of curvature of the two channels being equal whereby the channels are in register throughout, a circular row of hard spherical bals disposed in each channel, all of said balls being of equal diameter and the balls of each row being in mutual tangential contact so that all of the balls in the row present a circular solid column encircling said axis, the rows of balls associated with the two plates respectively being adapted to interfit with each other when the plates are in their proximate position with each ball in a row tangentially contacting two adjacent balls in the other row, the inside face of one of said plates being formed with a circular row of detent holes, one for each ball in a row, and a detent pin slidable in the other plate, projecting through the inside face thereof, and being designated for selective register with said detent holes when said indexing and base plates are in corresponding positions of indexing the projecting end of said detent pin being formed with a cam surface thereon designed for sliding engagement with the planar inside face of said one plate, said detent pin being movable between an extreme advanced projected position and an extreme retracted position, limit stop means determining said extreme positions of the detent pin, the effective axial extent of said detent pin being such that when the cam surface on the same is in sliding engagement with the inside face of said one plate and said detent pin is in its extreme retracted position the balls of the two rows are maintained by said detent pin out of contact with each other, and such that when the detent pin is in register with one of said holes, the cam surface on the pin projects partially into said hole and intersects the plane of the inside face of said one plate so that upon relative circumferential turning movement between the plates in either direction the cam surface may engage the rim of the hole and ride outwardly of the hole and onto the planar face of said one plate.

3. An indexing mechanism comprising a base plate, an indexing plate positioned in opposed relation with said base plate and rotatable relatively to the latter about a central axis at right angles to the two plates, said base and indexing plates being provided with means whereby they are relatively movable toward and away from each other in an axial direction between proximate and remote positions, means on each of the opposed faces of the plates and in the form of a cylindrical surface and a flat surface at right angles to the cylindrical surface, defining a circular recess concentric with said axis, the radii of curvature of the two recesses being equal whereby the recesses are in register throughout, a circular row of hard spherical balls disposed in each recess, all of said balls being of equal diameter and the balls of each row being functionally equal in number, the adjacent balls of each row being in mutual tangential contact so that all of the balls in the row present a circular column encircling said axis, the rows of balls associated with the two plates respectively being adapted to interfit with each other when the plates are in their proximate position with each ball in a row tangentially contacting the adjacent balls in the other row, a clamping ring concentric with and extending around each circular row of balls, having an inner frusto-conical surface in camming engagement with all of the balls in its respective row of balls, and having its large base disposed nearer to the flat surface of the associated plate than its small base, and cooperating screw-threaded means on each ring and its associated plate for drawing the ring toward said associated plate to bind said adjacent balls between said frusto-conical surface and the cylindrical surface of the adjacent recess.

4. An indexing mechanism as set forth in claim 3 and wherein each of said cooperating screw-threaded means comprises a series of clamping screws disposed at circumferentially spaced regions around the associated ring and operative to draw the latter towards its associated plate.

5. An indexing mechanism as set forth in claim 3 and wherein the cooperating screw-threaded means for the ring that is associated with the indexing plate comprises a series of clamping screws extending through holes in said ring at circumferentially spaced regions therearound and threadedly received in the indexing plate, and wherein the cooperating screw-threaded means for the ring that is associated with the base plate comprises a series of clamping screws extending through holes in the base plate and threadedly received in the associated ring at circumferentially spaced regions therearound.

References Cited in the file of this patent

UNITED STATES PATENTS

| | | |
|---|---|---|
| 452,524 | Jennings | May 19, 1891 |
| 2,233,950 | Lepetit | Mar. 4, 1941 |
| 2,288,722 | Lear et al. | July 7, 1942 |
| 2,305,728 | MillHolland | Dec. 22, 1942 |
| 2,369,209 | Bullard | Feb. 13, 1945 |
| 2,640,400 | Verderber | June 2, 1953 |
| 2,832,235 | Denman | Apr. 29, 1958 |
| 2,902,889 | Trechsel | Sept. 8, 1959 |
| 2,921,489 | Schabot | Jan. 19, 1960 |
| 2,929,274 | Goss | Mar. 22, 1960 |
| 2,959,065 | Musser | Nov. 8, 1960 |